Figure 1:
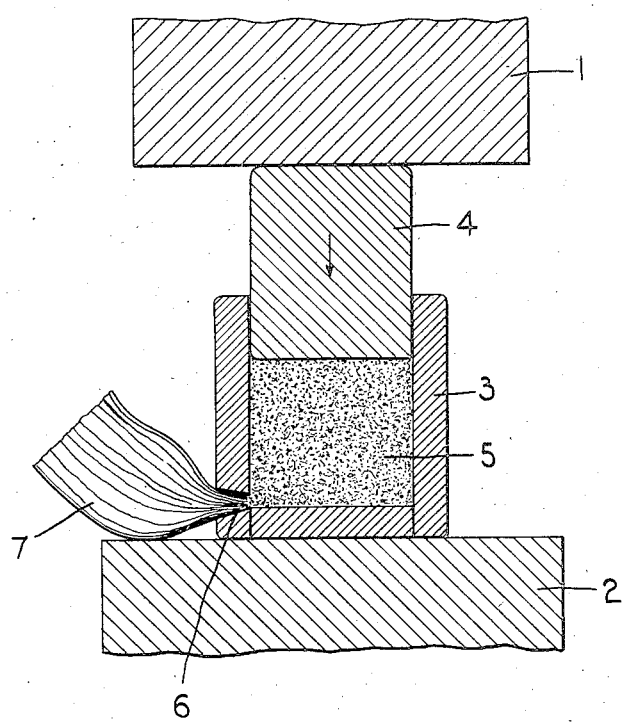

April 28, 1936.  P. SCHIDROWITZ ET AL  2,039,191

RUBBER DERIVATIVES

Filed Jan. 14, 1935

Inventors
Philip Schidrowitz &
Cyril Aubrey Redfarn
by
Attorney

Patented Apr. 28, 1936

2,039,191

UNITED STATES PATENT OFFICE 2,039,191

RUBBER DERIVATIVES

Philip Schidrowitz and Cyril Aubrey Redfarn, London, England, assignors to Rubber Producers Research Association, London, England, a body corporate of Great Britain Application January 14, 1935, Serial No. 1,784
In Great Britain May 24, 1933

5 Claims. (Cl. 18—55)

This invention relates to rubber derivatives and more especially to the treatment of chlorinated rubber whereby industrially useful products may be obtained.

One process of treatment according to the invention consists in subjecting chlorinated rubber to elevated pressure and temperature and in releasing the pressure while the temperature is maintained or before appreciable lowering of the temperature has taken place, instead of allowing the material to cool under pressure, whereby there is the most surprising result that a tough fibrous product of low specific gravity is obtained.

In carrying out this treatment resort may be had to the apparatus customarily used for pressure moulding, the chlorinated rubber, usually in the form of a powder, being placed in the mould and heated to a temperature in the neighbourhood of 320–350 F., while being subjected to the moulding pressure in the usual manner, the pressure being then released, e. g. by opening the mould. When cooled to normal temperature a fibrous mass of low specific gravity is obtained which is water resistant and non-flammable.

In the practice of the invention applied to the treatment of one sample the chlorinated rubber in powdered form, a mass of the powder is, for example, inserted in a pressure mould approximately 2¼" in diameter and subjected to a pressure sufficient to keep the mould closed, while being heated to 325° F. for three minutes, the pressure then being released and the mass within the mould swelling up and being permitted to cool under normal pressure conditions, whereupon a tough, water-resistant fibrous mass of non-communicating cells is obtained which has a specific gravity far less than the products normally obtained from the chlorinated rubber; indeed, the apparent specific gravity of the expanded material may be as low as 0.1 or even lower, which is obviously much less than that of the original chlorinated rubber, the specific gravity of which is well known to be in the neighborhood of 1.56. This is obvious in view of the fact that as the product is an expanded one it must necessarily have less than the specific gravity of the original substance from which the new product is formed.

It has also been found that the tough fibrous mass can be obtained by a modification of the process on the special type of press adapted for injection moulding, i. e. the chlorinated rubber is introduced into the heated cylinder of the press, and without closing the injection orifice, pressure is applied by means of the ram. The compressed and heated material is extruded through the orifice and immediately assumes some fibrous condition. With the chlorinated rubbers satisfactory results are readily obtained, but with others difficulty is likely to be experienced in effecting the expansion of the mass when the pressure is released and the present invention also comprehends developments of the process rendering it more readily effective with chlorinated rubbers in general.

With this object in view, liquids which exert a considerable vapour pressure at low temperatures may be incorporated with the chlorinated rubber prior to the treatment at elevated pressure and temperature, whereby on the pressure being released expansion readily takes place and a tough fibrous product of low specific gravity is obtained.

Preferably the liquids incorporated with the chlorinated rubber are those organic liquids which are volatile under the temperature conditions prevailing during the treatment, and it appears to be immaterial whether such liquids have a solvent action or not, benzene being a typical solvent of chlorinated rubber capable of producing the desired result, which may also be obtained with alcohol, a typical non-solvent.

Water, while volatile at the temperature of treatment, does not produce a satisfactory expanded product and similarly sodium bicarbonate is ineffective.

Applying the treatment involving the liquid addition, with each 30 gms. of the chlorinated rubber about 5 c. c. of benzene or alcohol is well mixed in a mortar before being placed in the mould and heated to a temperature of between 320° to 350° F., while being subjected to the moulding pressure in the usual manner. On release of the pressure the material expands and a fibrous mass of low specific gravity is obtained which is water resistant and non-flammable.

The treatment may be carried out as a continuous process, resort being had to the type of press employed for the extrusion of thermoplastic materials such as those derived from casein and cellulose acetate, and the invention will now be described with reference to the accompanying drawing which illustrates diagrammatically two forms of apparatus which may be employed for obtaining the expanded product, and in which drawing,—

Figure 2:
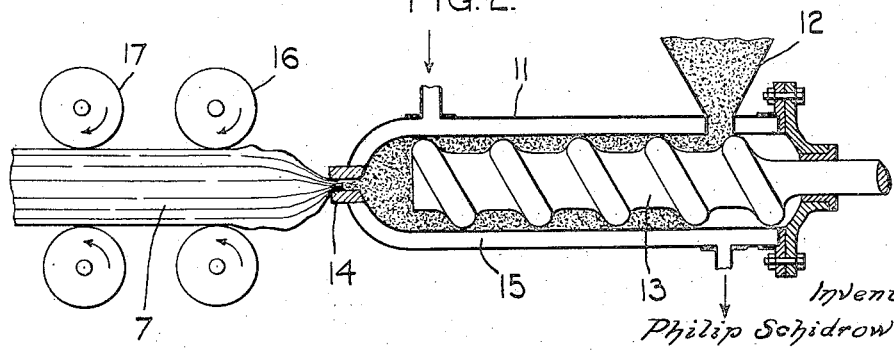

Fig. 1 is a view of a simplified form of mould for heating and compressing chlorinated rubber, while Fig. 2 shows apparatus by which the expanded fibre may be extruded continuously in sheet form.

Referring now to the drawing but first more particularly to Fig. 1, the heated platens of a hydraulic press are indicated at 1 and 2, the mould at 3, and a cover for such mould at 4, this latter being in the form of a plunger by means of which pressure may be applied to the contents of the mould by closing the press.

The empty mould 3 is heated for about fortyfive minutes at 350° F. and is then filled with chlorinated rubber indicated at 5. Just sufficient pressure is applied by the plunger 4 to keep the mould closed, and it is allowed to stand under heat and pressure for about five to thirty minutes according to the size of the mould. The mould 3 is furnished with an aperture or slit 6 and during this period the aperture is closed in any appropriate manner.

The aperture or slit 6 is then opened and the material slowly extruded by depressing the plunger 4, the extruded product expanding when released to atmospheric pressure, as shown at 7, and giving the expanded product of low specific gravity which is water resistant and non-flammable.

Referring now to Fig. 2 where apparatus for carrying out the process continuously and giving a product of sheet form is illustrated diagrammatically, 11 indicates a cylindrical press to which the chlorinated rubber is fed through a hopper 12, 13 being a feed screw rotated in any appropriate manner so as to feed the chlorinated rubber forwardly along the press towards the nozzle 14.

The body of the press 11 is shown channelled or jacketed at 15 and is maintained at the desired temperature by means of superheated steam passed through the channels, while the nozzle is maintained at a slightly higher temperature, for instance by means of gas jets or of an electrical resistance or resistances (not shown), the temperatures being controlled thermostatically, if desired.

16 and 17 indicate pairs of rollers through which the expanded material is passed on extrusion, the first pair of rollers 16 being conveniently heated, whereby too rapid cooling of the product is prevented.

The screw conveyor is rotated at a speed which will generate sufficient pressure in the forward end of the press to plasticize the chlorinated rubber and cause it to extrude through the nozzle 14, whereupon it expands to give the fibrous cellular product aforementioned which by passage between the rollers is formed into a substantially flat sheet.

The extrusion aperture in the nozzle preferably takes the form of an elongated slot giving the desired width of expanded material, while to facilitate setting of the product the rollers 17 or additional rollers may be artificially cooled.

As aforementioned, volatile liquids, such as benzene, toluene, xylene or alcohol, may be added to the chlorinated rubber before its introduction into the press, and for some purpose also plasticizers such as triacetin or dibutyl phthalate may be incorporated to ensure, with a view inter alia, the production of a stronger and tougher product.

Microscopic examination of the expanded product shows it to have a rough honeycomb structure, the cells being non-communicating and the cell walls showing flow lines, while an outer tougher skin encircling the product also shows the cell structure with the cells partially collapsed and elongated.

The conversion of the chlorinated rubber into fibrous, light, and to some extent resilient material, is probably due to the escape of volatile matter, either developed from a container in the chlorinated rubber, or added as heretofore described. The chlorine content of the altered product is not widely divergent from that of the chlorinated rubber, one, for example, with a chlorine content of approximately 68.8 giving an expanded product with a chlorine content of 67.6.

The solubility characteristics of the fibrous product are also similar to those of the chlorinated rubber, e. g., it is soluble in benzene, carbon bisulphide and trichlorethylene and practically insoluble in water, ethyl, alcohol and petroleum hydrocarbons.

In other respects, however, the expanded material possesses marked advantages, for although it is remarkably light it is non-flammable, comparatively resistant to moisture and substantially odourless. Moreover, it is comparatively strong and resilient and should prove of exceptional use as an insulating medium.

By the present invention stable and industrially valuable chlorinated rubbers are obtained capable of a variety of uses.

What we claim is:—

1. A process for treating chlorinated rubber to obtain an expanded fibrous product consisting in the preliminary steps of adding to the chlorinated rubber organic liquids which exert a considerable vapour pressure at low temperatures to facilitate expansion of the product, and plasticizing agents to toughen the expanded product, and then subjecting it to pressure and a temperature of between 320° to 350° F. and finally releasing the pressure before appreciable lowering of the temperature has taken place so that a tough expanded fibrous product results.

2. A fibrous expanded and water resistant product of chlorinated rubber having a network of non-communicating cells and a specific gravity as low as .1 or less.

3. A process for treating chlorinated rubber to obtain an expanded fibrous product consisting in subjecting it to pressure and an elevated temperature of between 320° and 350° F. and then releasing the pressure while the temperature is maintained or before appreciable lowering of the temperature has taken place, instead of allowing the material to cool under pressure.

4. A process for treating chlorinated rubber to obtain an expanded fibrous product, comprising the preliminary step of adding to the chlorinated rubber an organic liquid, such as benzine or alcohol capable of exerting a considerable vapor pressure at low temperatures to facilitate expansion of the material, then subjecting the resulting material to pressure and a temperature between 320° and 350° F., and finally releasing the pressure before appreciable lowering of the temperature has taken place, instead of allowing the material to cool under pressure.

5. A process for treating chlorinated rubber to obtain an expanded fibrous product, comprising the preliminary step of adding to the chlorinated rubber a plasticizing agent, such as triacetin or dibutyl phthalate, whereby a tougher expanded product is obtained, then subjecting the resulting material to pressure and a temperature between 320° and 350° F., and finally releasing the pressure before appreciable lowering of the temperature has taken place, instead of allowing the material to cool under pressure.

PHILIP SCHIDROWITZ.
CYRIL AUBREY REDFARN.